No. 858,419. PATENTED JULY 2, 1907.
J. SCHMIDT.
MANURE FORK.
APPLICATION FILED JAN. 19, 1907.
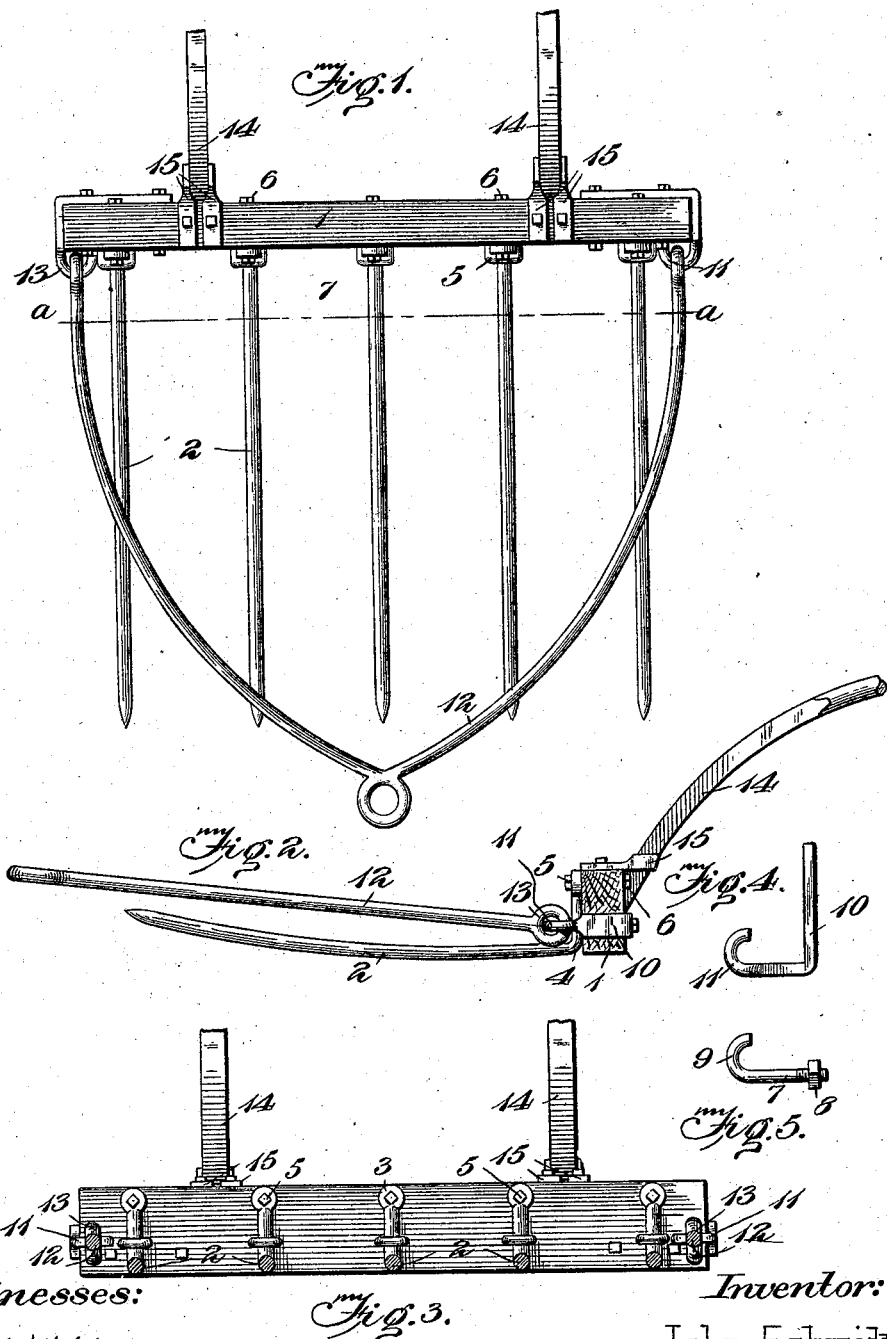
Witnesses:
Inventor:
John Schmidt
By G. H. Albee
Attorney

UNITED STATES PATENT OFFICE.

JOHN SCHMIDT, OF WOODVILLE, WISCONSIN.

MANURE-FORK.

No. 858,419.  Specification of Letters Patent.  Patented July 2, 1907.

Application filed January 19, 1907. Serial No. 353,048.

*To all whom it may concern:*

Be it known that I, JOHN SCHMIDT, a citizen of the United States, and a resident of Woodville, in the county of Calumet and State of Wisconsin, have invented a new and useful Improvement in Manure-Forks, of which the following is a specification.

My invention has reference to a fork to be drawn by a horse or other animal, for use in removing the manure from a stable where a large number of cows, or other animals are kept, and drawing it out of and away from the stable to some point in a yard, or it may be drawn up an inclined apron up into a wagon for being carried away to the field as desired. Another use for the fork is to remove manure from the yard and load it into a wagon, the fork consisting of a head piece, a series of tines bent near one end into nearly a right angle, the shorter end being provided with means for its attachment to said head piece, and the longer end suitably curved and pointed. An iron is secured upon the rear side of each end of the head piece, bent around its end and provided with a hook, and a bail is arranged for connection with a rope or chain by which the fork may be drawn, having at each end an eye adapted to be engaged by said hooks, and a pair of handles are attached to the rear side of the head piece by which the fork may be held and guided.

The invention is illustrated in the accompanying drawing, in which,—

Figure 1 is a plan of the fork. Fig. 2 is a side elevation of the fork, the fork handles in Figs. 1 and 3 being broken for want of room on the sheet. Fig. 3 is a front elevation as it appears beyond the line a, a, of Fig. 1. Fig. 4 is a plan of a bolt used in securing the fork tines to the head piece. Fig. 5 is an edge view of an iron having a hook to which the bail is hinged.

Similar numerals indicate like parts in the several views.

1, indicates the head piece, which may be of iron or wood, if of wood, about 3 x 5 inches will be a suitable size, and of a length suited to its purpose.

2, indicates tines formed preferably of a round steel rod, having a bolt hole 3, formed in one end, the other end being pointed and curved upward a little. About four inches from the center of their bolt holes the rods are bent at the point 4 to nearly a right angle, and they are attached to the head piece near its upper edge with bolts 5 which pass through said bolt holes and the head piece and are each provided with a nut 6. Near the lower edge of the head piece, staple bolts 7 are inserted, each having a nut 8 and hook 9, the latter being arranged to inclose one of the tines and clamp it firmly to the head piece. Upon the rear side of each end of the head piece, a rectangular piece of iron, 10, is bolted, it being bent around the end of the head piece and having a hook, 11. A bail 12, is formed of a round bar of iron for the connection with it of a rope or chain by which the fork may be drawn, and an eye 13, is formed in each of its ends, which eyes are connected with the hooks 11. The bail should be of such a length and form as will allow the bail to rest upon the tines, and not fall below them when the pull on the fork is slackened. Upon the rear side of the head piece, a pair of handles, 14, are secured in a suitable manner, in the present case, it is by boring holes at an angle with the rear side of the head piece and inserting one end of each handle. A brace, or tie, 15, may be bolted upon the upper side of the head piece and connect with a handle.

In operation, a rope or chain is to be connected with the bail, a team hitched to it, a person taking hold of the handles, when the tines being inserted into a quantity of manure and the fork guided by the person having hold of the handles, the team can load up the fork and then haul the loaded fork to the desired place for its deposit, with no other labor of the operators but to guide the team and fork, and thereby effecting a great saving of manual labor over the old method of using a hand fork and shovel.

Having described my invention, what I claim and desire to secure by Letters Patent, is,—

1. A fork adapted to be drawn by a team for removing manure from a stable or other place and delivering it to the desired place, consisting of a head piece of a suitable length, having greater vertical than horizontal dimenmensions in cross section, a plurality of tines, bent near one end into nearly a right angle, their longer ends being pointed and curved slightly upward, their shorter ends being provided near their extremities with a bolt hole, a bolt through each bolt hole and through the upper edge of said head piece, two rectangular metallic bars secured upon the rear side of said head piece, each bent around an end thereof and being provided with a hook, a bail arranged for the attachment to it of a flexible connection with which the fork may be drawn, an eye in each end of the bail adapted for connection with one of said hooks, and a pair of handles extending rearwardly of said head piece, and being secured thereto, by which the fork may be guided and operated, substantially as described.

2. A fork adapted to be drawn by a team for removing manure from a stable or other place, and delivering it to the desired place, consisting of a head piece having greater vertical than horizontal dimensions in cross section, a plurality of tines bent near one end into nearly a right angle, and arranged to extend forward of said head piece, each tine having a bolt hole at the extremity of its shorter end, a bolt for bolting each tine to the head piece through said bolt hole, a clamping bolt arranged for clamping each tine to said head piece near its lower edge, a hook arranged to extend forward of each end of said head piece, its shank extending around said end to the rear side thereof, and being secured thereto, a bail having an eye upon each end, hinged to said hooks and by which the fork may be drawn, and a pair of handles extending rearwardly of said head piece, and being secured thereto, substantially as set forth.

JOHN SCHMIDT.

Witnesses:
 WM. J. TESCH,
 P. F. MCMAHON.